(12) United States Patent
Ittelson

(10) Patent No.: US 12,388,881 B2
(45) Date of Patent: Aug. 12, 2025

(54) CONNECTING A PHONE DEVICE TO A VIRTUAL MEETING USING MULTI-FACTOR AUTHENTICATION

(71) Applicant: Zoom Communications, Inc., San Jose, CA (US)

(72) Inventor: Brendan James Ittelson, San Jose, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/504,716

(22) Filed: Nov. 8, 2023

(65) Prior Publication Data
US 2024/0073259 A1 Feb. 29, 2024

Related U.S. Application Data

(63) Continuation of application No. 17/160,208, filed on Jan. 27, 2021, now Pat. No. 11,856,037.

(51) Int. Cl.
| | |
|---|---|
| *H04L 65/1093* | (2022.01) |
| *H04L 9/40* | (2022.01) |
| *H04L 65/403* | (2022.01) |

(52) U.S. Cl.
CPC ........ *H04L 65/1093* (2013.01); *H04L 63/083* (2013.01); *H04L 63/0846* (2013.01); *H04L 63/0876* (2013.01); *H04L 65/403* (2013.01); *H04L 2463/082* (2013.01)

(58) Field of Classification Search
CPC ............... H04L 65/1093; H04L 63/083; H04L 63/0846; H04L 63/0876; H04L 65/403; H04L 2463/082
See application file for complete search history.

(56) References Cited

U.S. PATENT DOCUMENTS

| | | | |
|---|---|---|---|
| 6,731,731 B1 | 5/2004 | Ueshima | |
| 8,600,027 B1 * | 12/2013 | Doerr | .................. H04L 12/1818 |
| | | | 379/202.01 |
| 8,640,254 B2 | 1/2014 | Inaba | |
| (Continued) | | | |

OTHER PUBLICATIONS

Understanding Stir/Shaken, TransNexus, 2019. (9 pages).

*Primary Examiner* — Michael A Keller
(74) *Attorney, Agent, or Firm* — Young Basile Hanlon & MacFarlane, P.C.

(57) ABSTRACT

Multi-factor authentication techniques are used to verify an identity of an audio-only caller requesting to join a video-enabled virtual meeting. A request for an audio-only caller to join a video-enabled virtual meeting is received from a phone device of the audio-only caller, in which the audio-only caller is using the phone device to call into the video-enabled virtual meeting. An authentication request is transmitted to the phone device to verify an identity of the audio-only caller. A response to the authentication request is received from the phone device and includes an authentication code generated based on the request for the audio-only caller to join the video-enabled virtual meeting. The identity of the audio-only caller is then verified using the authentication code and information associated with the phone device, and the request for the audio-only caller to join the video-enabled virtual meeting is allowed or denied based on the verification.

20 Claims, 8 Drawing Sheets

(56) References Cited

U.S. PATENT DOCUMENTS

| | | | |
|---|---|---|---|
| 8,929,257 B1* | 1/2015 | Goepp | H04N 7/152 |
| | | | 370/260 |
| 9,053,310 B2 | 6/2015 | Oberheide et al. | |
| 9,197,701 B1 | 11/2015 | Petrov et al. | |
| 9,455,988 B2 | 9/2016 | Oberheide et al. | |
| 9,769,318 B1 | 9/2017 | Sapkota et al. | |
| 9,961,197 B2 | 5/2018 | Kurapati et al. | |
| 10,223,520 B2 | 3/2019 | Oberheide et al. | |
| 10,237,081 B1 | 3/2019 | Narayanaswamy | |
| 10,440,016 B2 | 10/2019 | Oberheide et al. | |
| 10,623,575 B1* | 4/2020 | Synal | H04M 3/563 |
| 2005/0268107 A1* | 12/2005 | Harris | H04L 63/0853 |
| | | | 713/182 |
| 2007/0050448 A1 | 3/2007 | Gonen et al. | |
| 2008/0181140 A1 | 7/2008 | Bangor et al. | |
| 2016/0050238 A1* | 2/2016 | Vendrow | H04L 65/403 |
| | | | 709/206 |
| 2022/0086630 A1 | 3/2022 | Shaw | |
| 2022/0116392 A1* | 4/2022 | Shah | H04L 63/0876 |
| 2023/0401304 A1* | 12/2023 | Abdou | G06F 21/41 |

\* cited by examiner

CONNECTING A PHONE DEVICE TO A VIRTUAL MEETING USING MULTI-FACTOR AUTHENTICATION

CROSS-REFERENCE TO RELATED APPLICATION(S)

This application is a continuation of U.S. application Ser. No. 17/160,208, filed Jan. 27, 2021, the entire disclosure of which is herein incorporated by reference.

BACKGROUND

Virtual meetings help people all around the world to connect with one another every day in a variety of business and personal settings. A virtual meeting may be video-enabled to allow participants to see each other in real-time and may also accommodate participants interacting with others through audio alone. Virtual meeting platforms use network connections with participant devices to facilitate audio and/or video communications between participants. The growing ubiquity of network-connected devices enables more and more people to communicate over virtual meetings every day.

SUMMARY

Disclosed herein are, inter alia, implementations of systems and techniques for multi-factor authentication for audio meeting participants.

One aspect of this disclosure is a method, which includes receiving, from a phone device of an audio-only caller, a request for the audio-only caller to join a video-enabled virtual meeting. An authentication request is transmitted to the phone device to verify an identity of the audio-only caller. A response to the authentication request including an authentication code generated based on the request for the audio-only caller to join the video-enabled virtual meeting is received from the phone device. Responsive to verifying the identity of the audio-only caller using the authentication code and information associated with the phone device, the request for the audio-only caller to join the video-enabled virtual meeting is allowed.

Another aspect of this disclosure is a method, which includes detecting that an audio-only caller requesting to join a video-enabled virtual meeting is using a phone device to call into the video-enabled virtual meeting. Responsive to the detecting, an authentication request is transmitted to the phone device to verify an identity of the audio-only caller. A response to the authentication request including an authentication code generated for the audio-only caller is received from the phone device. Responsive to verifying the identity of the audio-only caller using the authentication code, the audio-only caller is allowed to join the video-enabled virtual meeting.

Yet another aspect of this disclosure is a method, which includes receiving an authentication code generated based on a request for an audio-only caller to join a video-enabled virtual meeting, in which the request for the audio-only caller to join the video-enabled virtual meeting is received from a phone device of the audio-only caller and includes a meeting identifier for the video-enabled virtual meeting. Information associated with the phone device is obtained responsive to verifying the meeting identifier. The request for the audio-only caller to join the video-enabled virtual meeting is then allowed responsive to verifying an identity of the audio-only caller using the authentication code and the information associated with the phone device.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
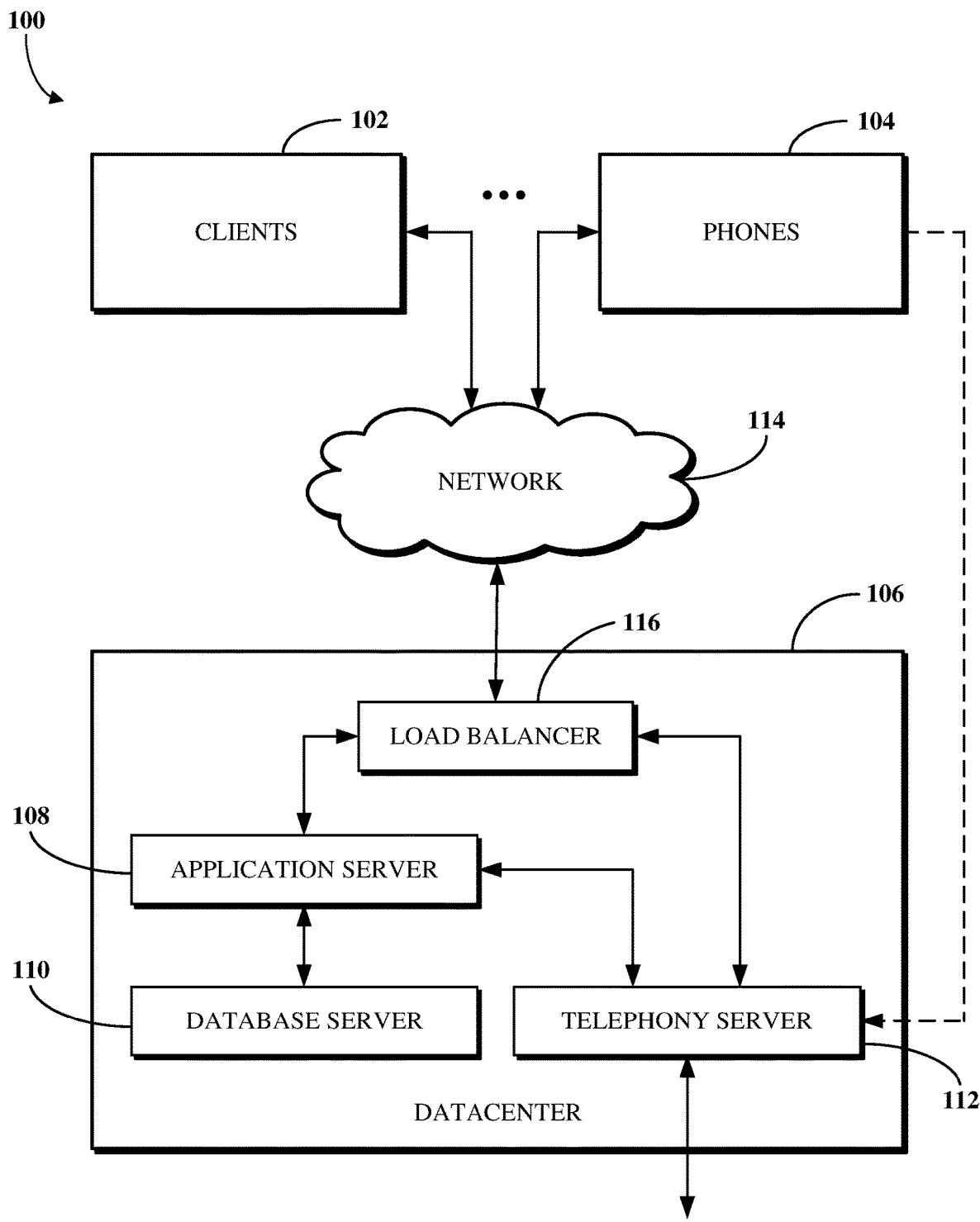
FIG. 1 is a block diagram of an example of an electronic computing and communications system.

Online security is an increasingly complex but important field, as malicious actors continue to seek new ways to intercept credentials and gain access to locked or private data and communications. In the context of a virtual meeting, participants accessing the virtual meeting through a client may log into the virtual meeting using authenticated credentials, such as a username and/or password, or a participant may use an encrypted link processed via the client to authenticate the participant.

Although useful to users of clients, these conventional authentication techniques are generally not available to meeting participants calling into a virtual meeting from via a telephony connection. For example, it may be difficult or impossible for an audio-only caller to enter a username and/or password. Furthermore, these conventional authentication techniques to do not themselves provide a mechanism to verify an identity of the audio-only caller. For example, a malicious actor who gains access to an email account of an audio-only caller may use credentials within an email thereof to access the virtual meeting without ever sharing his or her true identity.

One solution for verifying a user identity is two-factor authentication, in which a user registers a secondary device with a system. When the user attempts to access a system service from a primary device, the system sends a verification code to the secondary device, typically a SMS message sent to a cell phone. Because it is unlikely that a malicious actor will have access to the secondary device itself, the timely entry of the verification code within the system verifies the identity of the user to allow user access to the service. Another solution involves using a tokenization system to verify device access based on a valid token issued by a system service.

However, these solutions are not suitable for verifying an identity of an audio-only caller requesting to join a virtual meeting from a phone. For example, two-factor authentication is likely not useful for audio-only callers because they typically do not have access to a secondary device. Furthermore, because many phones are used without access to client-side features for receiving tokens, audio-only callers may not be able to benefit from a token system in every case. Thus, these solutions do not accommodate the verification of an identity of an audio-only caller joining a virtual meeting over a telephony line and using a single device.

Implementations of this disclosure address problems such as these using multi-factor authentication techniques for verifying an identity of an audio-only caller requesting to join a video-enabled virtual meeting. A request for an audio-only caller to join a video-enabled virtual meeting is received from a phone device of the audio-only caller, in which the audio-only caller is using the phone device to call into the video-enabled virtual meeting. An authentication request is transmitted to the phone device to verify an identity of the audio-only caller. A response to the authentication request is received from the phone device and includes an authentication code generated based on the request for the audio-only caller to join the video-enabled virtual meeting. The identity of the audio-only caller is then verified using the authentication code and information associated with the phone device, and the request for the audio-only caller to join the video-enabled virtual meeting is allowed or denied based on the verification. Thus, the identity of the audio-only caller is verified using the information associated with the phone device and the authentication code, and without requiring a secondary device or the use of a token.

To describe some implementations in greater detail, reference is first made to examples of hardware and software structures used to implement multi-factor authentication for audio meeting participants. FIG. 1 is a block diagram of an example of an electronic computing and communications system 100, which can be or include a distributed computing system (e.g., a client-server computing system), a cloud computing system, a clustered computing system, or the like. The system 100 connects various clients 102 and/or phones 104 to services implemented within or otherwise using a datacenter 106. The system 100 can connect a number of clients 102 and/or phones 104 or can have a configuration of clients or phones different from that generally illustrated in FIG. 1. For example, and without limitation, the system 100 can connect hundreds or thousands of clients and/or phones.

A client 102 may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a device. In some implementations, a client can be implemented as a single physical unit or as a combination of physical units. In some implementations, a single physical unit can include multiple clients.

A phone 104 may be or otherwise refer to one or both of a phone device or a phone application such as a softphone. For example, a phone 104 may be a smart phone or other cell phone which may or may not be configured to run mobile applications, such as a client 102. In another example, a phone 104 may be a desk phone, such as a desktop unit configured to at least send and receive calls and includes an input device for receiving a telephone number or extension to dial to and an output device for outputting audio and/or video for a call in progress. In yet another example, the phone 104 may be a softphone representing telephony functionality of a client 102. A phone 104 may or may not be voice over IP (VOID)-enabled.

The datacenter 106 includes one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers.

The datacenter 106 includes servers used for implementing software services. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106.

In some implementations, one or more of the servers 108 through 112 can be a non-hardware aspect implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to the clients 102 and at least partially to the phones 104. The software services may be or include virtual meeting software which enables audio, video, and/or other forms of virtual meetings between multiple devices (e.g., between ones of the clients 102, between ones of the phones 104, or between ones of the clients 102 and ones of the phones 104), such as to facilitate a conference between the users of those devices. The virtual meeting software can include functionality for hosting, presenting scheduling, joining, or otherwise participating in a virtual meeting. The virtual meeting software may further include functionality for recording some or all of a virtual meeting and/or documenting a transcript for the virtual meeting. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client 102 as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client 102. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, one of the clients 102 or the application server 108.

The telephony server 112 enables network-based telephony and web communications from and to ones of the clients 102 and ones of the phones 104 which are VOIP-enabled devices configured to send and receive calls over a network, for example, a network 114. In particular, the telephony server 112 includes a session initiation protocol (SIP) zone and a web zone. The SIP zone enables a client 102 or a phone 104 (e.g., a VOIP-enabled phone), to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client 102 or a phone 104 (e.g., a VOIP-enabled phone) and directs same to a destination device. The SIP zone may include one or more call switches for routing the telephony traffic. For example, to route a VOIP call from a first VOIP-enabled client to a second VOIP-enabled client within the same domain or network, the telephony server 112 may initiate a SIP transaction between a first client and the second client using a PBX. However, in another example, to route a VOIP call from a VOIP-enabled client to a client or phone which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between ones of the clients 102 and/or between ones of the phones 104. When incoming telephony traffic for delivery to a client 102 or a phone 104 originating from outside the telephony server 112 is received, a SBC receives the traffic and forwards it to a call switch for routing to the client 102 or the phone 104.

The web zone receives telephony traffic from a client 102 or a phone 104, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 102 and the phones 104 communicate with aspects of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof. In some implementations in which one or more of the phones 104 is not a VOIP-enabled device, those one or more of the phones 104 may communicate other than via the network 114.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 102, by the application server 108, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
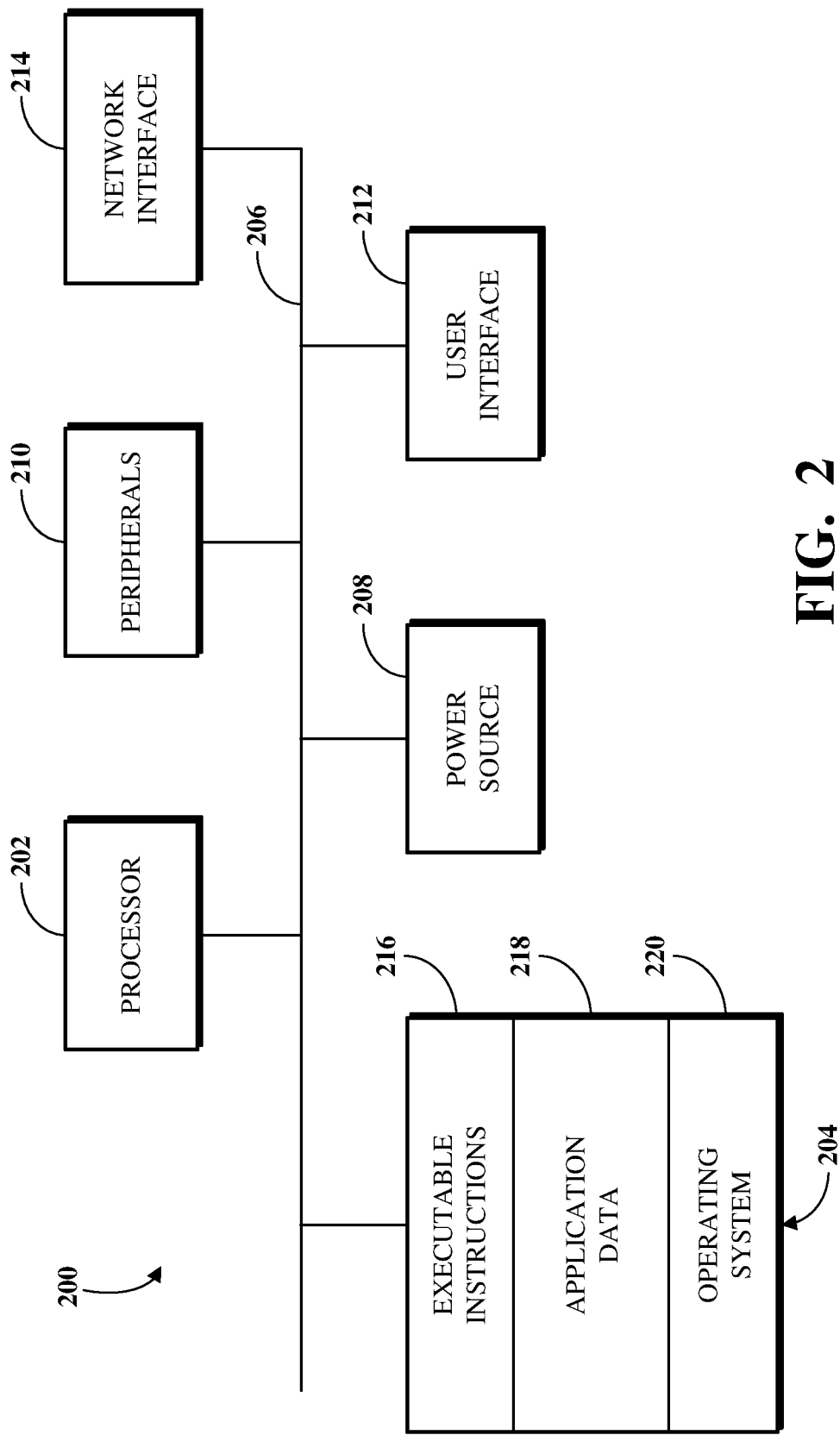
FIG. 2 is a block diagram of an example internal configuration of a computing device of an electronic computing and communications system.

FIG. 2 is a block diagram of an example internal configuration of a computing device 200 of an electronic computing and communications system, for example, a computing device which implements one or more of one of the clients 102, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, general packet radio service (GPRS), global system for mobile communications (GSM), code-division multiple access (CDMA), Z-Wave, another protocol, or a combination thereof.

Figure 3:
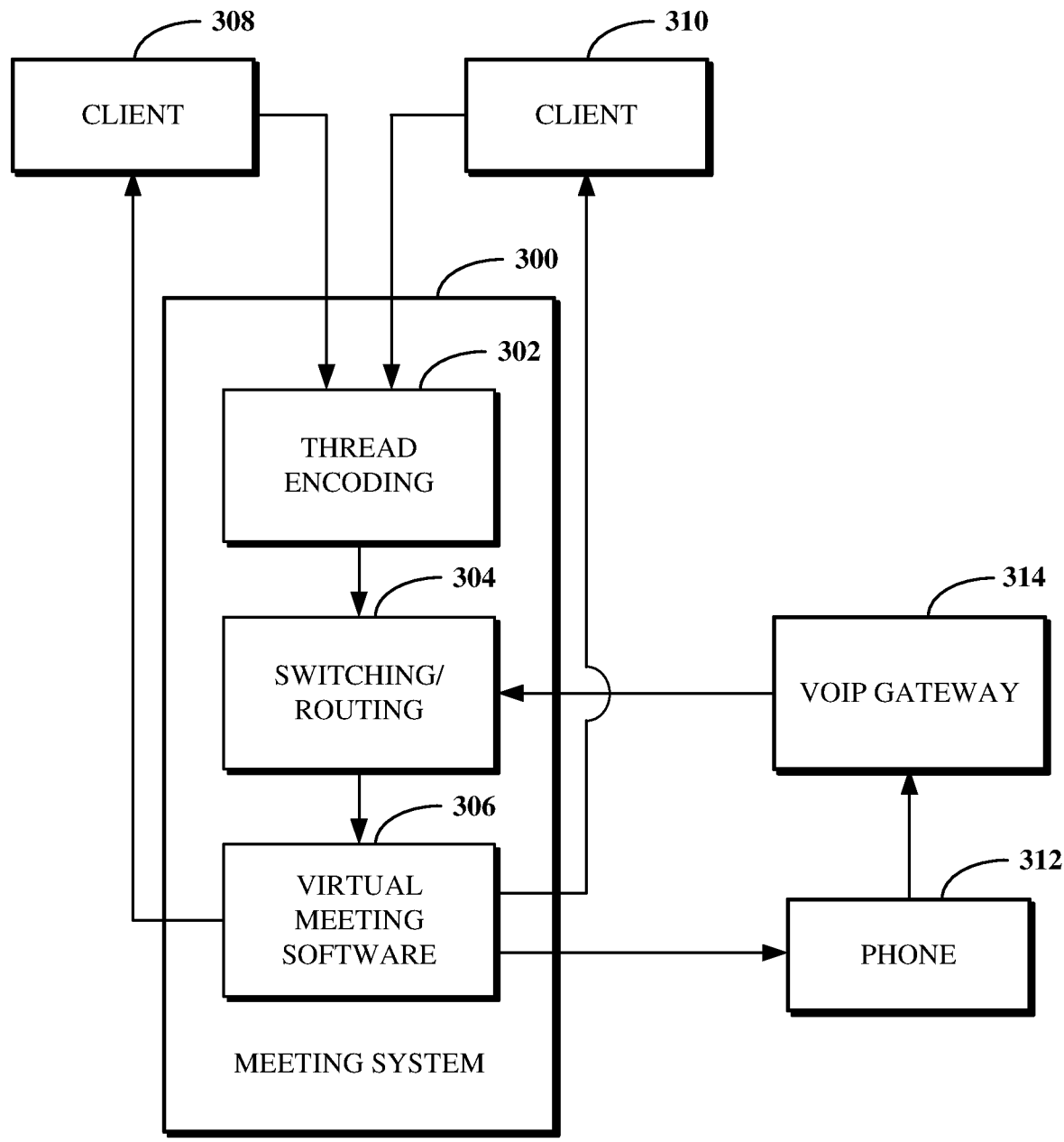
FIG. 3 is a block diagram of an example of a meeting system for delivering virtual meeting software services in an electronic computing and communications system.

FIG. 3 is a block diagram of an example of a meeting system 300 for delivering virtual meeting software services in an electronic computing and communications system, for example, the system 100 shown in FIG. 1. The meeting system 300 includes a thread encoding tool 302, a switching/routing tool 304, and virtual meeting software 306. The meeting system 300 enables use of the virtual meeting software 306 by clients and phones, such as clients 308 and 310 and phone 312. For example, one or both of the clients 308 or 310 may be a client 102 shown in FIG. 1. In another example, the phone 312 may be a phone 104 shown in FIG. 1. The meeting system 300 may in at least some cases be implemented using one or more servers of the system 100. Although two clients and a phone are shown in FIG. 3, other numbers of clients and/or other numbers of phones can connect to the meeting system 300.

A virtual meeting includes transmitting and receiving video, audio, and/or other data between clients and/or phones of virtual meeting participants. Each of the client 308, the client 310, and the phone 312 may connect through the meeting system 300 using separate input streams to enable users thereof to participate in a virtual meeting together using the virtual meeting software. The virtual meeting software 306 is software for implementing virtual meetings between users of two or more clients and/or phones. For example, the virtual meting software 306 can be the virtual meeting software described above with respect to the application server 108 of FIG. 1.

The virtual meeting software 306 includes a dedicated meeting view for each input stream received and processed at the meeting system 300. For example, a meeting view may be represented within a graphical user interface (GUI) of the virtual meeting software 306 by a dedicated box for a given participant. The content of the meeting view for a given participant may be dependent upon the source of the input stream for that participant. For example, where a participant accesses the virtual meeting software 306 from a client, such as the client 308 or 310, the meeting view for the participant may include a video output stream transmitted from the meeting system for viewing by all participants based on a video input stream received from the client, although the participant may optionally disable video features to suspend the video output stream from being presented in the meeting view. In another example, where a participant access the virtual meeting software 306 from a phone, such as the phone 312, the meeting view for the participant may be limited to a static image or other default background aspect since there is no video output stream produced for that participant.

The thread encoding tool 302 receives video input streams separately from the clients 308 and 310 and encodes those video input streams using one or more transcoding tools, such as to produce variant streams at different resolutions. The video input streams may be received over a network, for example, the network 114 shown in FIG. 1, or by a direct wired connection, such as using a universal serial bus (USB) connection or like coupling aspect. After the video input streams are encoded, the switching/routing tool 304 direct the encoded streams through applicable network infrastructure and/or other hardware to deliver the encoded streams to the virtual meeting software 306. The virtual meeting software 306 delivers output video streams representative of the respective encoded streams to each connected client, such as the clients 308 and 310, which receive and decode the output video streams to output them for display by video output components of the clients, such as within respective meeting views of the virtual meeting software 306.

A user of the phone 312 participates in the virtual meeting using an audio-only connection and may thus be referred to an audio-only caller. To participate in the virtual meeting from the phone 312, an audio signal from the phone 312 is received and processed at a VOIP gateway 314 to prepare a digital telephony signal for processing at the meeting system 300. The VOIP gateway 314 may be part of the system 100, for example, implemented at or in connection with a server of the datacenter 106. Alternatively, the VOIP gateway 314 may be located on the user-side, such as in a same location as the phone 312. The digital telephony signal is a packet switched signal transmitted to the switching/routing tool 304 for delivery to the virtual meeting software 306. The virtual meeting software 306 outputs an audio signal representing a combined audio capture for each participant of the virtual meeting for output by an audio output component of the phone 312. In some implementations, the VOIP gateway 314 may be omitted, for example, where the phone 312 is a VOIP-enabled phone.

A virtual meeting may be referred to as a video-enabled virtual meeting in which video streaming is enabled for one or more participants. The enabling of video streaming for a participant of a virtual meeting does not require that the participant activate or otherwise use video functionality for participating in the virtual meeting. For example, a virtual meeting may still be a video-enabled virtual meeting where none of the participants joining using clients turns on their video feed for any portion of the virtual meeting. In some cases, however, the virtual meeting may have video disabled, such as where each participant connects to the virtual meeting using a phone rather than a client, or where a host of the virtual meeting selectively configures the virtual meeting to exclude video functionality.

In some implementations, other software services may be accessible in connection with a virtual meeting implemented using the meeting system 300. For example, a virtual meeting may include or otherwise integrate functionality for instant messaging, unified messaging, and other types of messaging communications between participants of the virtual meeting, such as to facilitate a chat or like virtual conversation between users of those participants. Those other software services may be implemented at the meeting system 300 and/or a different aspect of the system 100.

Figure 4:
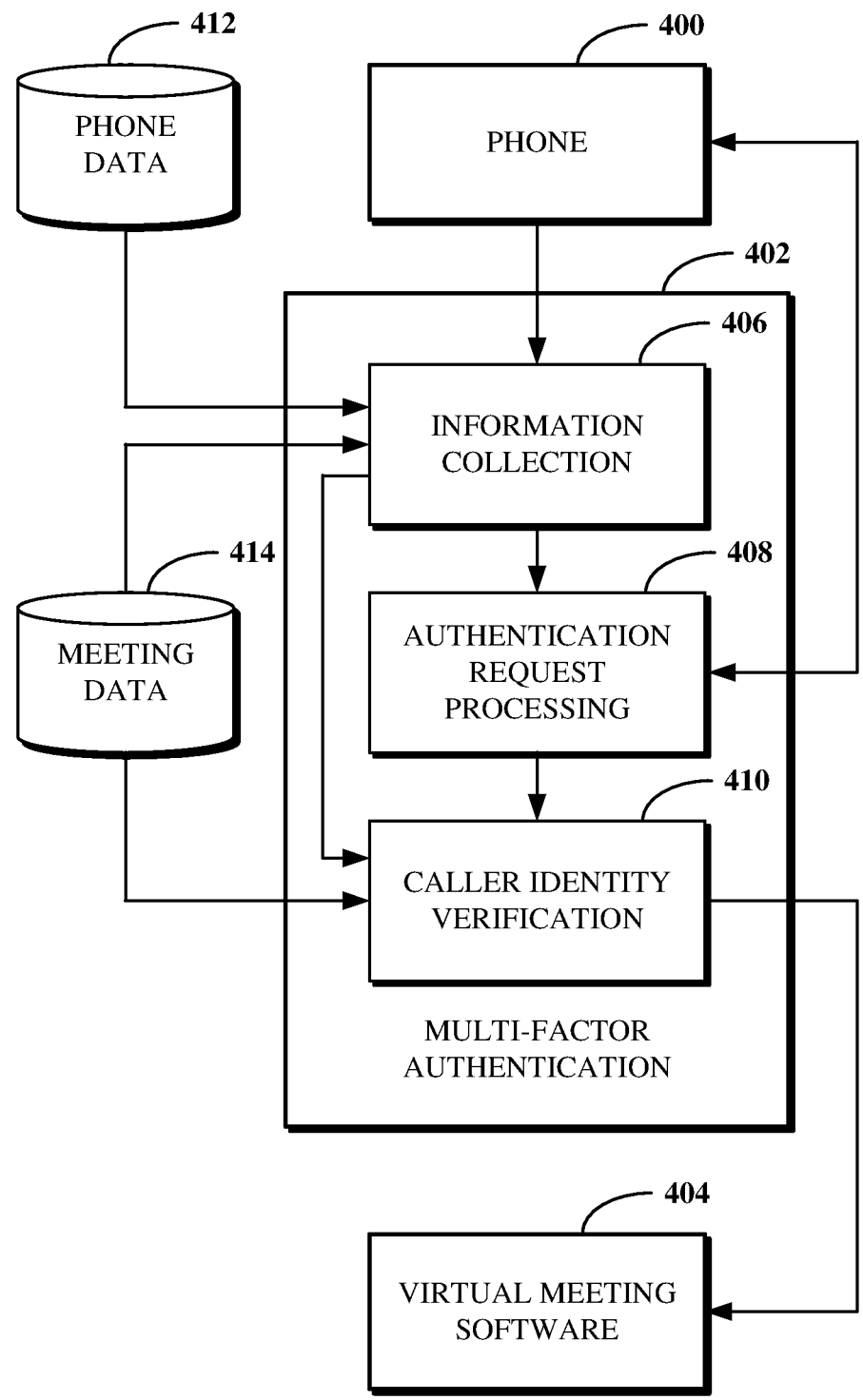
FIG. 4 is a block diagram of an example of multi-factor authentication for authenticating an audio-only caller requesting to join a virtual meeting.

FIG. 4 is a block diagram of an example of multi-factor authentication for authenticating an audio-only caller requesting to join a virtual meeting. A phone 400, which may, for example, be the phone 312 shown in FIG. 3, transmits a request received by a multi-factor authentication tool 402 for an operator of the phone 400 to join a virtual meeting (e.g., a video-enabled virtual meeting) implemented by virtual meeting software 404, which may, for example, be the virtual meeting software 306 shown in FIG. 3. The multi-factor authentication tool 402 is software which processes the request for the operator of the phone 400, who is an audio-only caller given that the operator seeks to join the virtual meeting over a telephony connection, to verify the identity of the audio-only caller before the audio-only caller is allowed to join the virtual meeting at the virtual meeting software 404.

The multi-factor authentication tool 402 and the virtual meeting software 404 may be implemented by different servers or by the same server, for example, the application server 108 shown in FIG. 1. As shown, the multi-factor authentication tool 402 is separate from the virtual meeting software 404. However, in some implementations, the multi-factor authentication tool 402 may be included in the virtual meeting software 404. For example, the multi-factor authentication tool 402 may represent a threshold check process performed at the virtual meeting software 404 itself for verifying an identity of an audio-only caller before allowing the audio-only caller to join a virtual meeting.

As shown, the multi-factor authentication tool 402 includes an information collection tool 406, an authentication request processing tool 408, and a caller identity verification tool 410. However, in some implementations, the multi-factor authentication tool 402 may include other tools in addition to or instead of the tools 406 through 410.

The information collection tool 406 obtains information associated with the phone 400 and a meeting identifier associated with the virtual meeting the audio-only caller is requesting to join. The meeting identifier is some information for uniquely identifying a particular virtual meeting implemented at the virtual meeting software 404. The information associated with the phone 400 includes one or more of caller ID information, contact record information, proximity information, and device owner information.

In some cases, the information associated with the phone 400 and the meeting identifier are both obtained within the request for the audio-only caller to join the virtual meeting received from the phone 400. For example, the request for the audio-only caller to join the virtual meeting can include the meeting identifier, and the information collection tool 406, responsive to the request for the audio-only caller to join the virtual meeting, can transmit a request to obtain the information associated with the phone 400 from the phone 400. In other cases, the meeting identifier is received from the phone 400 and at least some of the information associated with the phone 400 is received from a phone data database 412. For example, the phone data database 412 can store information associated with phones which have previously been used to join a virtual meeting at the virtual meeting software 404. The phone data database 412 may, for example, be implemented by the database server 110 shown in FIG. 1.

In another example, a meeting data database 414 which includes information associated with guests who are authorized to join virtual meetings can include information associated with phones of those guests, who may be audio-only callers. The meeting identifier received from the phone 400 can be used to search through the meeting data of the meeting data database for information associated with the virtual meeting corresponding to the meeting identifier received from the phone 400. That information associated with the virtual meeting may, for example, include at least some information associated with the phone 400. In some cases, the information associated with the phone 400 obtained from within the meeting data database 414 may be used to search the phone data database 412 for other aspects of the information associated with the phone 400.

The authentication request processing tool 408 transmits an authentication request to verify an identity of the audio-only caller to the phone 400 and receives a response to the authentication request from the phone 400. The authentication request may be a request for an authentication code generated based on the request for the audio-only caller to join the virtual meeting received from the phone 400. In some cases, the authentication code is generated at the multi-factor authentication tool 402 and then transmitted to the phone 400 so that the operator of the phone 400 can transmit the authentication code within the response to the authentication request from the phone 400. In other cases, the authentication code is generated at the phone 400 using instructions for generating the authentication code transmitted to the phone 400 from the multi-factor authentication tool 402. The authentication code is generated particular to the phone 400, the audio-only caller, and the virtual meeting the audio-only caller is requesting to join.

The caller identity verification tool 410 verifies the identity of the audio-only caller to determine whether to allow or deny the request for the audio-only caller to join the virtual meeting at the virtual meeting software 404. The caller identity verification tool 410 verifies the identity of the audio-only caller based on the response to the authentication request received from the phone 400, and, optionally based also on the information associated with the phone 400 and/or the meeting identifier received from the phone 400.

Verifying the identity of the audio-only caller based on the response to the authentication request includes determining whether the response to the authentication request includes the authentication code. For example, the response to the authentication request may be parsed to search for data matching the authentication code. The verification is successful where the response to the authentication request includes the authentication code. The verification fails where the response to the authentication request omits the authentication code, for example, by entirely omitting the authentication code or including a misrepresentation (e.g., a misspelling) of the authentication code.

Verifying the identity of the audio-only caller based on the response to the authentication request and based on the information associated with the phone 400 and/or the meeting identifier received from the phone 400 includes the above related to the verification of the response to the authentication request, as well as verifying the meeting identifier and at least some of the information associated with the phone 400. For example, the meeting data database 414 can be searched for the meeting identifier. The meeting identifier may be successfully verified where the search of the meeting data database 414 identifies an upcoming or in-progress virtual meeting associated with the meeting identifier. The verification of the meeting identifier fails where the search of the meeting data database 414 does not identify such an upcoming or in-progress virtual meeting. In another example, the meeting data database 414 can be searched for the virtual meeting associated with the meeting identifier, but to identify information associated with authorized guests of the virtual meeting. The information associated with the phone 400 may be successfully verified where at least some of that information is represented within the meeting data database 414 record for the virtual meeting; otherwise, the verification of the information associated with the phone 400 fails.

Where each verification performed by the caller identity verification tool 410 is successful, the identity of the audio-only caller is deemed to have been successfully verified. In such a case, the request for the audio-only caller to join the virtual meeting is allowed, and the phone 400 is connected into the virtual meeting software 404 accordingly. However, where at least one verification performed by the caller identity verification tool 410 fails, the identity of the audio-only caller is deemed to have failed. In such a case, the request for the audio-only caller to join the virtual meeting is denied, and the phone 400 is prohibited from connecting into the virtual meeting software 404.

In some implementations, a failed verification by the caller identity verification tool 410 may prompt one or more subsequent caller identity verification checks. For example, upon the verification of the identity of the audio-only caller failing, a new authentication code can be generated, and the operations performed by the authentication request processing tool 408 and the caller identity verification tool 410 can be repeated until a successful verification of the identity of the audio-only caller or until a maximum number of unsuccessful attempts have been made, whichever occurs first.

Figure 5:
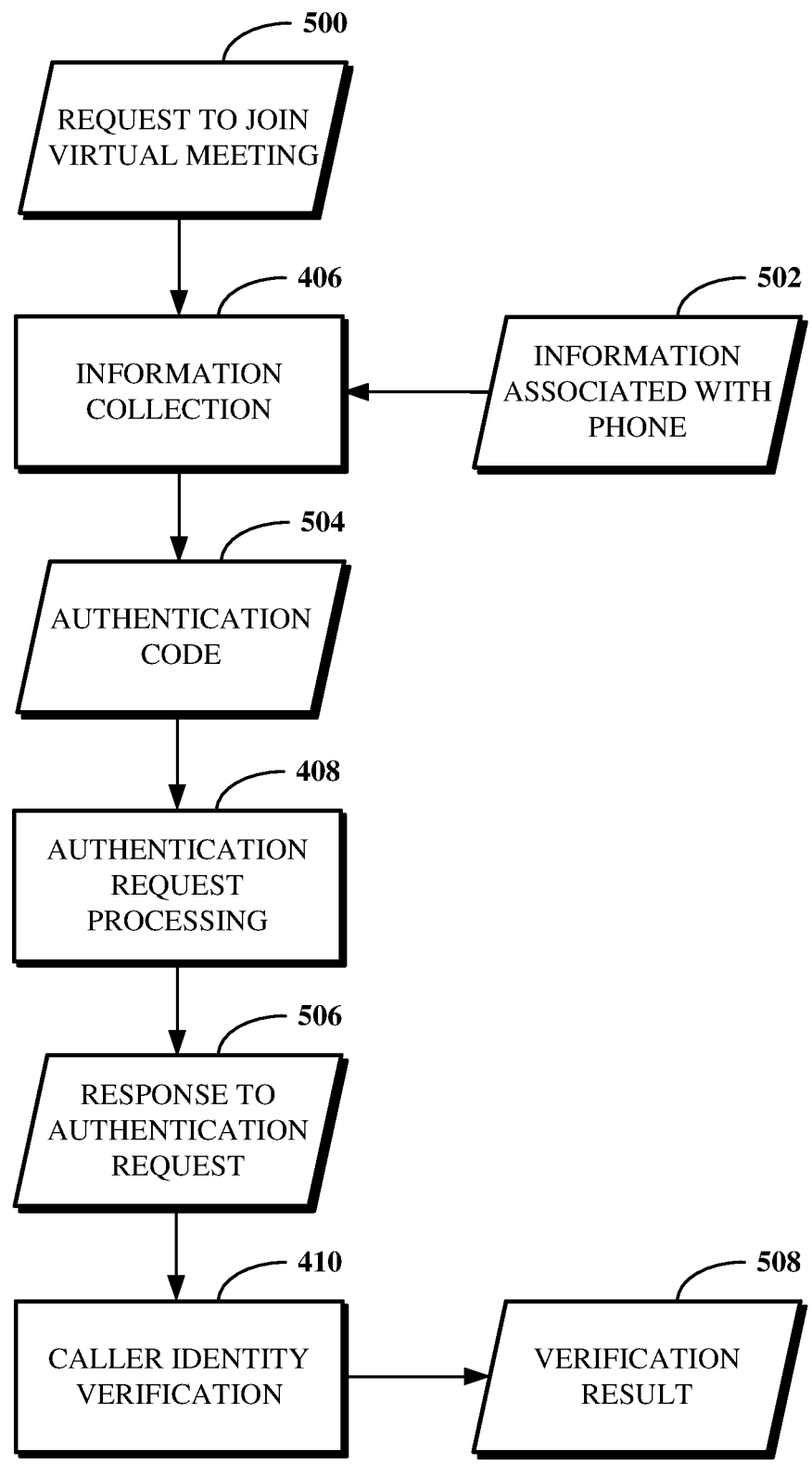
FIG. 5 is a block diagram of example inputs and outputs of a multi-factor authentication tool.

FIG. 5 is a block diagram of example inputs and outputs of a multi-factor authentication tool, such as the multi-factor authentication tool 402 shown in FIG. 4. In particular, FIG. 5 visually represents the data flows between the tools 406 through 410 shown in FIG. 4. A request 500 for an audio-only caller to join a virtual meeting is received by the information collection tool 406, which obtains information 502 associated with the phone. The processing of the request 500 and the information 502 may ultimately result in the generation of an authentication code 504, which serves as the basis for the processing performed by the authentication request processing tool 408. The authentication request processing tool 408 receives a response 506 to an authentication request, which response 506 is processed by the caller identity verification tool 410 to result in a verification result 508.

Figure 6:
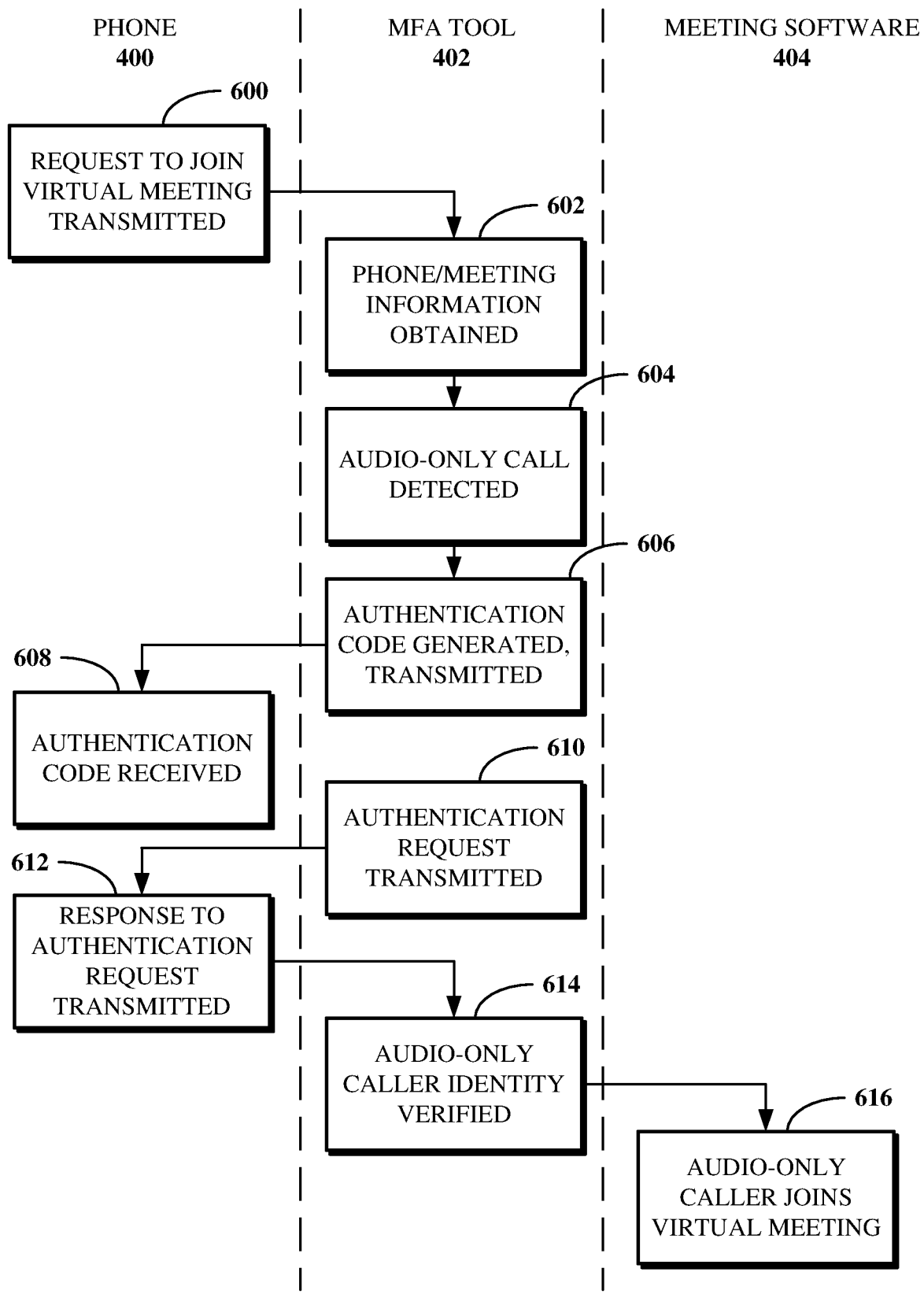
FIG. 6 is an illustration of swim lanes showing a first example sequence of operations performed for multi-factor authentication.
Figure 7:
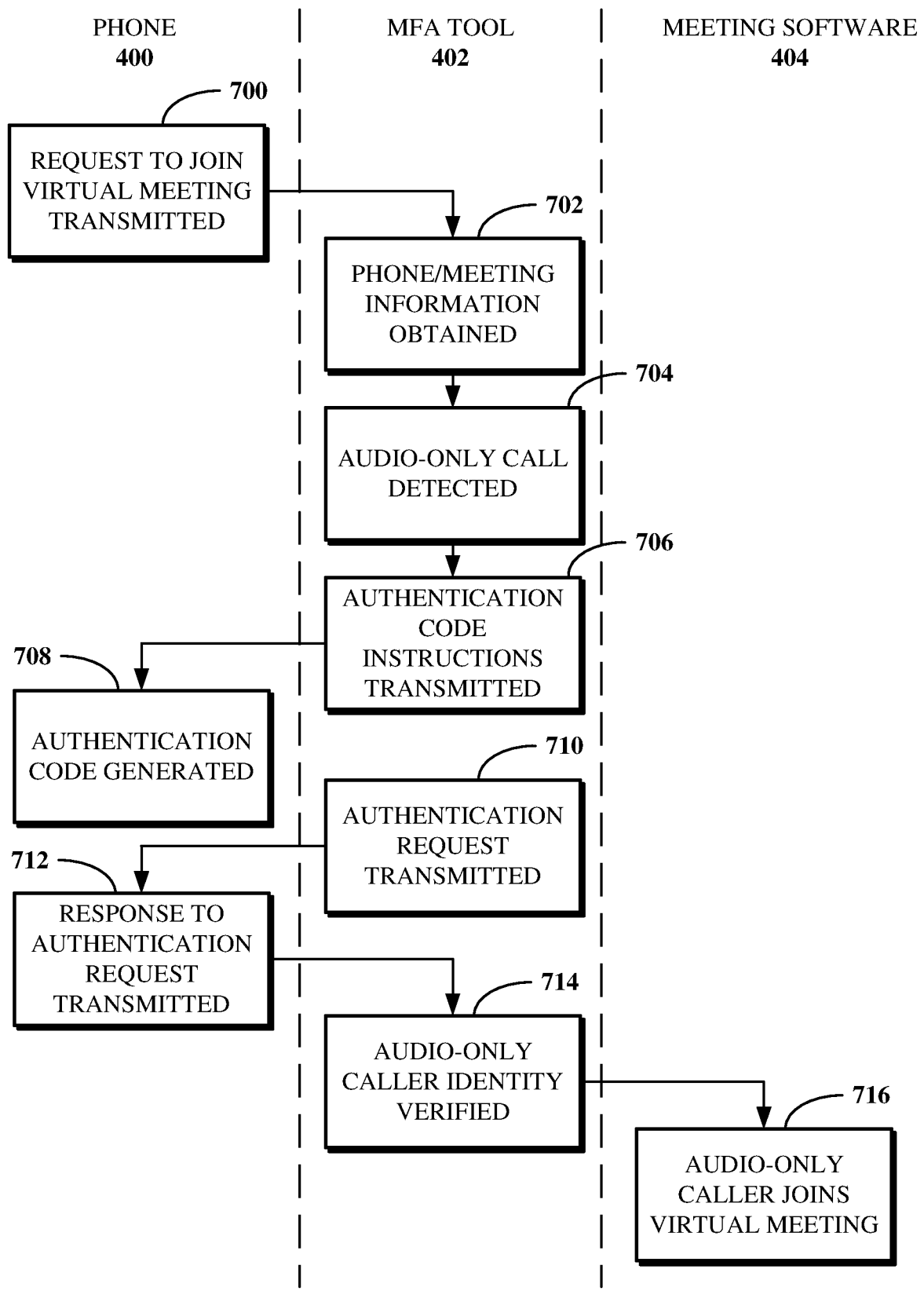
FIG. 7 is an illustration of swim lanes showing a second example sequence of operations performed for multi-factor authentication.

FIGS. 6 and 7 are illustrations of swim lanes showing example sequences of operations performed for multi-factor authentication between the phone 400, the multi-factor authentication tool 402, and the virtual meeting software 404 shown in FIG. 4. Referring first to FIG. 6, a first example sequence of operations performed for multi-factor authentication is shown. At 600, a request to join a virtual meeting, for example, the request 500 shown in FIG. 5, is transmitted from the phone 400 to the multi-factor authentication tool 402. At 602, information associated with the phone 400, for example, the information 502 shown in FIG. 5, and meeting information such as a meeting identifier are obtained at the multi-factor authentication tool 402. At 604, the multi-factor authentication tool 402 detects, based on the information associated with the phone 400, that the request to join the virtual meeting is received over a telephony connection and thus that the operator of the phone 400 is an audio-only caller. At 606, the multi-factor authentication tool generates an authentication code, for example, the authentication code 504 shown in FIG. 5, and transmits the authentication code to the phone 400, which the phone 400 receives at 608. At 610, an authentication request is transmitted from the multi-factor authentication tool 402 to the phone 400. At 612, a response to the authentication request, for example, the response 506 shown in FIG. 5, is transmitted from the phone 400 to the multi-factor authentication tool 402. At 614, the multi-factor authentication tool verifies the identity of the audio-only caller, for example, to determine the verification result 508 shown in FIG. 5. At 616, based on the verification result, the audio-only caller joins the virtual meeting at the virtual meeting software 404.

Referring next to FIG. 7, a second example sequence of operations performed for multi-factor authentication is shown. The example sequence shown in FIG. 7 is largely the same as the example sequence shown in FIG. 6, except that the authentication code is generated at the phone 400 instead of at the multi-factor authentication tool 402. At 700, a request to join a virtual meeting, for example, the request 500 shown in FIG. 5, is transmitted from the phone 400 to the multi-factor authentication tool 402. At 702, information associated with the phone 400, for example, the information 502 shown in FIG. 5, and meeting information such as a meeting identifier are obtained at the multi-factor authentication tool 402. At 704, the multi-factor authentication tool 402 detects, based on the information associated with the phone 400, that the request to join the virtual meeting is received over a telephony connection and thus that the operator of the phone 400 is an audio-only caller. At 706, the multi-factor authentication tool transmits to the phone 400 instructions usable at the phone 400 to generate an authentication code, for example, the authentication code 504 shown in FIG. 5. At 708, the authentication code is generated at the phone 400. At 710, an authentication request is transmitted from the multi-factor authentication tool 402 to the phone 400. At 712, a response to the authentication request, for example, the response 506 shown in FIG. 5, is transmitted from the phone 400 to the multi-factor authentication tool 402. At 714, the multi-factor authentication tool verifies the identity of the audio-only caller, for example, to determine the verification result 508 shown in FIG. 5. At 716, based on the verification result, the audio-only caller joins the virtual meeting at the virtual meeting software 404.

Figure 8:
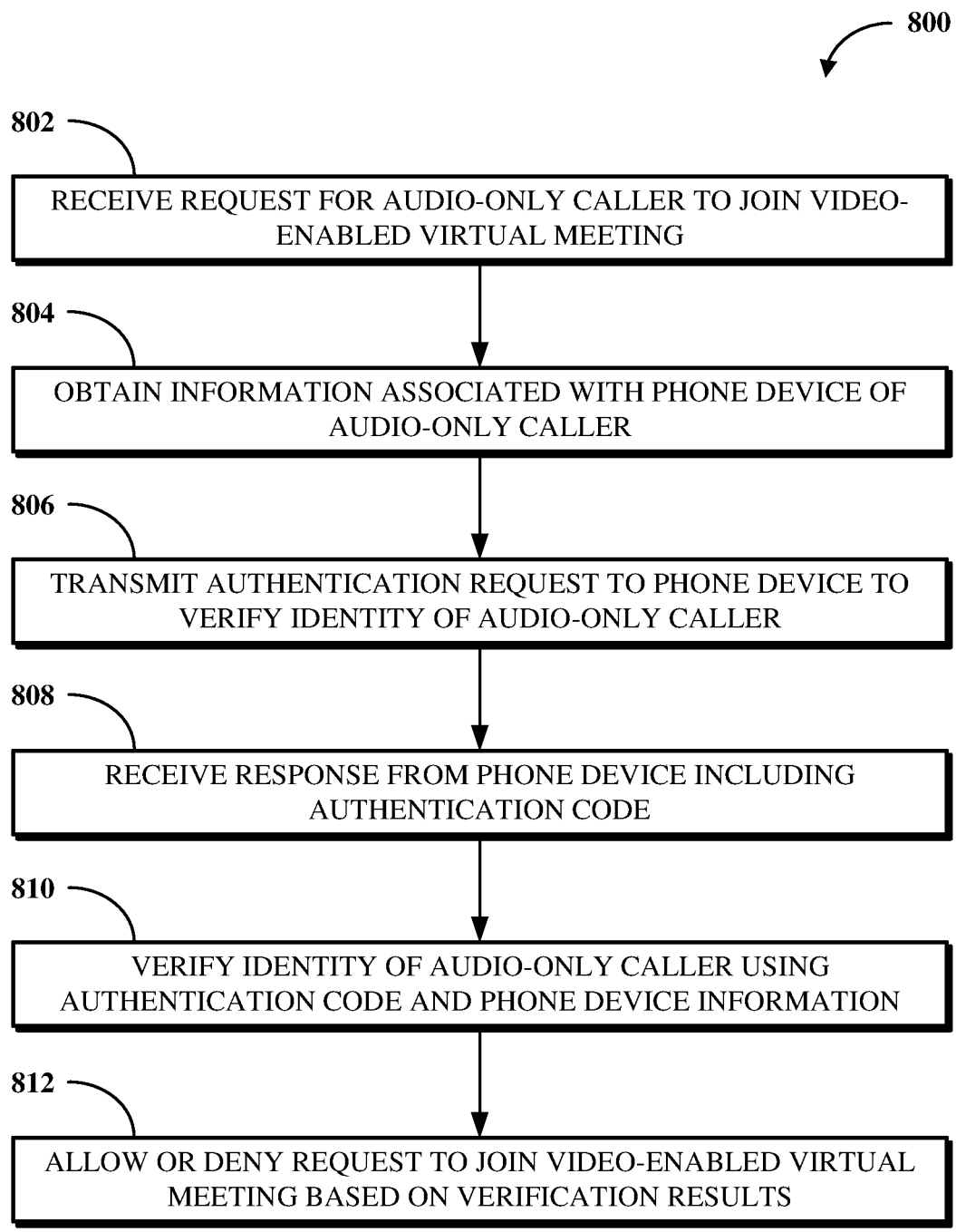
FIG. 8 is a flowchart of an example of a technique for multi-factor authentication for audio meeting participants.

To further describe some implementations in greater detail, reference is next made to examples of techniques which may be performed using multi-factor authentication for audio meeting participants. FIG. 8 is a flowchart of an example of a technique 800 for multi-factor authentication for audio meeting participants. The technique 800 can be executed using computing devices, such as the systems, hardware, and software described with respect to FIGS. 1-7. The technique 800 can be performed, for example, by executing a machine-readable program or other computer-executable instructions, such as routines, instructions, programs, or other code. The steps, or operations, of the technique 800 or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, a request for an audio-only caller to join a video-enabled virtual meeting is received from a phone device of an audio-only caller. The request for the audio-only caller to join the video-enabled virtual meeting is received at a server device which runs software for implementing all or a portion of the virtual meeting. The request for the audio-only caller to join the video-enabled virtual meeting includes a telephony signal indicating a telephone number associated with a virtual meeting software service used for the video-enabled virtual meeting. In some implementations, the request for the audio-only caller to join the video-enabled virtual meeting may also or instead include a meeting identifier for the video-enabled virtual meeting.

At 804, information associated with the phone device of the audio-only caller is obtained. The information associated with the phone device includes one or more of caller ID information, contact record information, location information, and device owner information. In some implementations, the information associated with the phone device may include other information in addition to or instead of some or all of the information described above. The information associated with the phone device is obtained responsive to the request for the audio-only caller to join the video-enabled virtual meeting. The information may be obtained from a database of the system used for the multi-factor authentication, from the phone device itself, or from another source.

The caller ID information refers to an emergency location identification number (ELIN) of the phone device. The contact record information includes information of one or more phonebook contacts stored at or for the phone device. The proximity information includes information related to a location of the phone device at the time the request for the audio-only caller to join the video-enabled virtual meeting is received from it and/or locations of the phone device at one or more previous times. The device owner information identifies an owner of the device, which may, for example, be the audio-only caller, a relative of the audio-only caller, an employer of the audio-only caller, or another person or entity.

At 806, an authentication request to verify an identity of the audio-only caller is transmitted to the phone device of the audio-only caller. The authentication request includes a request for the audio-only caller to verify his or her identity using an authentication code generated based on the request for the audio-only caller to join the video-enabled virtual meeting. The authentication code is generated based on the request for the audio-only caller to join the video-enabled virtual meeting. The authentication code may be generated before the authentication request is transmitted, but after the request for the audio-only caller to join the video-enabled virtual meeting is received. Alternatively, authentication code may be generated after the authentication request is transmitted. As a further alternative, the authentication code may be generated concurrently or substantially concurrently with the transmission of the authentication request.

The authentication code may be generated at the server device or at the phone device of the audio-only caller. For example, where the server device generates the authentication code, the server device may transmit the authentication code to the phone device based on the request for the audio-only caller to join the video-enabled virtual meeting. In another example, where the phone device generates the authentication code, the server device may transmit instructions for generating the authentication code to the phone device based on the request for the audio-only caller to join the video-enabled virtual meeting. In some implementations, the instructions to generate the authentication code include information usable to generate the authentication code, for example, a hashing function and an input thereto. In some implementations, the instructions to generate the authentication code include instructions for software running on the phone device to run an algorithm synchronized with the server device. Whether the authentication code is generated at the server device or at the phone device, the server device knows the authentication code (e.g., by temporarily storing the authentication code or the instructions therefor in an encrypted format) and will use that knowledge of the authentication code later to verify the identity of the audio-only caller.

In some implementations, the authentication code may be generated at the phone device without the server device transmitting instructions for generating the authentication code to the phone device. For example, software running at the phone device may be synchronized with the server device when the phone device is registered with the meeting software of the server device. In such a case, the server device may not transmit data to the phone device, but rather merely signal a response when queried by the phone device.

When the authentication code is generated other than at the phone device, the authentication may be transmitted in one of several ways. For example, the authentication code may be transmitted to the phone device by text message or instant message, to a registered email address of the audio-only caller, or in another manner. In some implementations, where the phone device is a smart phone, the authentication code may be transmitted to a connected application which may, for example, use some form of encrypted communication with the server device to securely receive the authentication code.

The authentication request is transmitted to the phone device responsive to the request for the audio-only caller to join the video-enabled virtual meeting. In some implementations, the server device uses the information associated with the phone device to detect that the audio-only caller is using the phone device to call into the video-enabled virtual meeting. For example, a caller ID number of the phone device can be used to verify that the phone device is in communication with the server device based on a telephony signal (e.g., a phone call) from the phone device. The authentication request may thus in such an implementation be transmitted to the phone device responsive to the detecting.

In some implementations where the request for the audio-only caller to join the video-enabled virtual meeting includes a meeting identifier for the video-enabled virtual meeting, the meeting identifier may be verified before the authentication request is transmitted to the phone device. For example, the server device may search through records of virtual meetings based on the meeting identifier to verify that the meeting identifier is valid (e.g., that it pertains to an upcoming or in-progress virtual meeting) and to identify a guest list for the virtual meeting associated therewith. The information associated with the phone device is used to determine whether the audio-only caller is on the guest list.

At 808, a response to the authentication request is received from the phone device of the audio-only caller. The response to the authentication request includes information which will be used to verify the identity of the audio-only caller, for example, the authentication code. The response to the authentication request is received in at least one of a text format or an audio format. For example, the authentication code may be a text code or an audio code. Thus, the particular form of the authentication response may be based on the form of the authentication code. For example, where the authentication code is a text code, the response to the authentication request may be received via a messaging service or a website associated with the video-enabled virtual meeting. The messaging service may be or include a software service which runs one or more of text messaging software, email software, chat software, or the like. In another example, where the authentication code is an audio code, the response to the authentication request may be verbally received from the phone device via a call connection between the phone device and the server device, such as during a same call connection used to receive the request for the audio-only caller to join the video-enabled virtual meeting. The response to the authentication request may be processed using natural language processing.

At 810, an identity of the audio-only caller is verified. The identity of the audio-only caller is verified using the authentication code and optionally also using the information associated with the phone device. In particular, verifying the identity of the audio-only caller includes determining whether the response to the authentication request includes the authentication code. This may be performed my parsing the response to the authentication request and comparing portions of the parsed response to the authentication code as it is known to the server device. Verification using the authentication code requires a complete match of the authentication code as known to the server device with at least a portion of the parsed response.

Verification using the information associated with the phone device includes using a meeting identifier received from the phone device to determine whether the audio-only caller is named on a guest list for the video-enabled virtual meeting. The server device searches through records of virtual meetings based on the meeting identifier to verify that the meeting identifier is valid (e.g., that it pertains to an upcoming or in-progress virtual meeting) and to identify a guest list for the virtual meeting associated therewith. The information associated with the phone device is used to determine whether the audio-only caller is on the guest list. For example, the guest list may include a list of phone numbers of authorized participants, a list of domains associated with one or more phone device owners, and/or other information.

As described above, in some implementations, the meeting identifier may be received as the request for the audio-only caller to join the video-enabled virtual meeting or as part of that request. In some implementations, the meeting identifier may be received from the phone device separate from the request for the audio-only caller to join the video-enabled virtual meeting. For example, the authentication request may include a request for the user to provide the meeting identifier. In another example, a separate request for the meeting identifier may be transmitted to the phone device.

In some implementations, the authentication code may be a time-limited single-use code. In such a case, verifying the identity of the audio-only caller can include determining whether a time-limit associated with the authentication code has elapsed. The time-limit associated with the authentication code is determined to be elapsed if an amount of time equal to or greater than the time-limit has passed since a start time of the authentication code, which may, for example, be a time at which the authentication code is generated at the server device or a time at which the instructions for generating the authentication code are transmitted to the phone device, as applicable. The value of the time-limit may be set in one or more ways. For example, the time-limit may have a default value, for example, five minutes. In another example, the time-limit may be variable such as based on one or more factors related to the video-enabled virtual meeting the audio-only caller seeks to join, for example, configurable settings of the video-enabled virtual meeting indicative of a security level for the virtual meeting. In some implementations, the time-limit may be adjusted after the start time for the authentication code.

At 812, the request for the audio-only caller to join the video-enabled virtual meeting is allowed or denied based on the results of the verification. In particular, the request for the audio-only caller to join the video enabled virtual meeting is allowed responsive to a successful verification of the identity of the audio-only caller, for example, using the authentication code and optionally the information associated with the phone device. Upon the request for the audio-only caller to join the video enabled virtual meeting being allowed, the audio-only caller is entered into the video-enabled virtual meeting as a participant.

However, the request for the audio-only caller to join the video enabled virtual meeting is denied responsive to a failed verification of the identity of the audio-only caller. For example, the verification may fail where the response to the authentication request does not include the authentication code (e.g., where the authentication code is omitted, misspelled, misspoken, etc., as applicable) In another example, where the authentication code is a time-limited single-use code, the verification may fail where a time-limit for the authentication code has elapsed. Upon the request for the audio-only caller to join the video enabled virtual meeting being denied, the audio-only caller is prevented from accessing or otherwise participating in the video-enabled virtual meeting.

In some implementations, responsive to a failed verification, the server device may optionally transmit a new authentication code or instructions for generating a new authentication code, as applicable, to the phone device to repeat the authentication request and response process. This repetition may be limited to a single additional attempt or to more than one additional attempt. A second or subsequent verification of the identity of the audio-only caller may thus be performed based on the new authentication code.

In some implementations, the technique 800 may omit obtaining the information associated with the phone device. In such an implementation, the authentication code is transmitted to the phone device without reference to or otherwise using such phone device information, and the identity of the audio-only caller is verified without reference to or otherwise using such phone device information.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media (e.g., as a non-transitory computer readable medium storing instructions operable to cause one or more processors to perform operations), and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:
1. A method, comprising:
  transmitting, based on a phone device requesting to join a video-enabled virtual meeting, a multi-factor authen- tication request to the phone device to verify an identity of a user of the phone device; and connecting the phone device to the video-enabled virtual meeting based on a verification of the identity using a multi-factor authentication code that is obtained from the phone device in response to the multi-factor authentication request without use of a secondary user device and is generated based on the phone device requesting to join the video-enabled virtual meeting.

2. The method of claim 1, comprising:

receiving, from the phone device, the multi-factor authentication code within a response to the multi-factor authentication request; and verifying the identity of the user of the phone device using the multi-factor authentication code.

3. The method of claim 1, comprising:

generating the multi-factor authentication code in response to a request from the phone device to join the video-enabled virtual meeting.

4. The method of claim 1, comprising:

transmitting instructions for generating the multi-factor authentication code to the phone device.

5. The method of claim 1, comprising:

verifying the identity of the user of the phone device using the multi-factor authentication code and information associated with the phone device, wherein the information associated with the phone device includes one or more of caller ID information, contact record information, proximity information, and device owner information.

6. The method of claim 1, comprising:

obtaining a meeting identifier for the video-enabled virtual meeting based on a request from the phone device to join the video-enabled virtual meeting; and verifying the meeting identifier.

7. The method of claim 1, comprising:

determining, using information associated with the phone device, that the user of the phone device is using the phone device to call into the video-enabled virtual meeting.

8. The method of claim 1, comprising:

generating the multi-factor authentication code before or substantially concurrent with the transmitting of the multi-factor authentication request to the phone device.

9. The method of claim 1, comprising:

generating the multi-factor authentication code after or substantially concurrent with the transmitting of the multi-factor authentication request to the phone device.

10. The method of claim 1, comprising:

receiving, from the phone device, a response to the multi-factor authentication request in at least one of a text format or an audio format.

11. A non-transitory computer readable medium storing instructions operable to cause one or more processors to perform operations comprising:

transmitting, based on a phone device requesting to join a video-enabled virtual meeting, a multi-factor authentication request to the phone device to verify an identity of a user of the phone device; and connecting the phone device to the video-enabled virtual meeting based on a verification of the identity using a multi-factor authentication code that is obtained from the phone device in response to the multi-factor authentication request without use of a secondary user device and is generated based on the phone device requesting to join the video-enabled virtual meeting.

12. The non-transitory computer readable medium of claim 11, the operations comprising:

obtaining, from the phone device, a meeting identifier for the video-enabled virtual meeting, wherein the multi-factor authentication request is transmitted to the phone device based on a verification of the meeting identifier.

13. The non-transitory computer readable medium of claim 11, the operations comprising one of:

transmitting the multi-factor authentication code to the phone device; or transmitting instructions for generating the multi-factor authentication code to the phone device.

14. The non-transitory computer readable medium of claim 11, wherein the multi-factor authentication code is transmitted to the phone device via a messaging service.

15. The non-transitory computer readable medium of claim 11, wherein the multi-factor authentication code is a text code or an audio code.

16. A system, comprising:

one or more memories; and one or more processors configured to execute instructions stored in the one or more memories to:

transmit, based on a phone device requesting to join a video-enabled virtual meeting, a multi-factor authentication request to the phone device to verify an identity of a user of the phone device; and connect the phone device to the video-enabled virtual meeting based on a verification of the identity using a multi-factor authentication code that is obtained from the phone device in response to the multi-factor authentication request without use of a secondary user device and is generated based on the phone device requesting to join the video-enabled virtual meeting.

17. The system of claim 16, wherein the one or more processors are configured to execute the instructions to:

determine whether a time-limit associated with the multi-factor authentication code has elapsed;

responsive to a determination that the time-limit has not elapsed, perform the verification of the identity of the user of the phone device using the multi-factor authentication code; and responsive to a determination that the time-limit has elapsed, deny the verification without connecting the phone device to the video-enabled virtual meeting.

18. The system of claim 16, wherein the one or more processors are configured to execute the instructions to:

obtain information associated with the phone device in response to a request from the phone device to join the video-enabled virtual meeting; and verify the identity of the user of the phone device using the multi-factor authentication code and the information associated with the phone device.

19. The system of claim 16, wherein the one or more processors are configured to execute the instructions to:

determine whether the user of the phone device is named on a guest list for the video-enabled virtual meeting.

20. The system of claim 16, wherein the multi-factor authentication code is transmitted to the phone device using an intermediary application.

* * * * *